United States Patent [19]
Levinson et al.

[11] Patent Number: 5,334,832
[45] Date of Patent: Aug. 2, 1994

[54] APPARATUS AND METHODS FOR DETERMINING SPLICE EFFECTIVENESS BETWEEN TWO OPTICAL FIBERS USING SOLID GELS AS COUPLING ENHANCERS FOR MEASURING COMPONENT ATTENUATION

[75] Inventors: Frank H. Levinson, Palo Alto; Martin L. Wisecarver, Pittsburgh, both of Calif.

[73] Assignee: Photonix Industries, Los Angeles, Calif.

[21] Appl. No.: 78,021

[22] Filed: Jun. 15, 1993

[51] Int. Cl.$^5$ ............................................... H01J 5/16
[52] U.S. Cl. .......................... 250/227.24; 356/73.1; 385/32; 385/140
[58] Field of Search ............ 250/227.11, 227.24; 356/73.1, 435; 385/32, 15, 48, 140

[56] References Cited

U.S. PATENT DOCUMENTS

| | | | |
|---|---|---|---|
| 3,982,123 | 9/1976 | Goell et al. | 385/32 |
| 4,398,794 | 8/1983 | Palmer et al. | 385/32 |
| 4,708,476 | 11/1987 | So et al. | 356/73.1 |
| 4,728,169 | 3/1988 | Campbell et al. | 385/32 |
| 4,783,137 | 11/1988 | Kosman et al. | 250/227.24 |
| 4,902,327 | 2/1990 | Levinson | 356/73.1 |
| 5,189,300 | 2/1993 | Lieber et al. | 250/227.24 |

*Primary Examiner*—David C. Nelms
*Assistant Examiner*—Stephen B. Allen
*Attorney, Agent, or Firm*—Ellsworth R. Roston; Charles H. Schwartz

[57] ABSTRACT

Two (2) optical fibers each having a core, a cladding enveloping the core and a buffer enveloping the cladding are spliced. First and second positions are adjacent the first fiber and third and fourth positions are adjacent the second fiber. The second and third positions are respectively closer to the splice than the first and fourth positions. Light emitters are at the first and fourth positions and light detectors are at the other positions. Light from each emitter is selectively passed to individual ones of the detectors. Members (e.g. solid gels) adjacent the emitters direct light into the associated fibers. Other members (e.g. solid gels) respectively between the first and second positions and between the third and fourth positions inhibit the light passage in the fiber claddings and buffers so that only the light in the fiber cores passes to the detectors. The gels and the fibers are clamped to provide matching dimples for trapping in the gels the light in the claddings and buffers. Still other members (e.g. solid gels) at the detectors enhance the light passage in the cores to the detectors. The gels and the fibers are clamped to provide matching dimples for enhancing the light passage in the cores to the detectors. A processor computes the square root of the ratio between the product of two of the detector indications and the product of the other two (2) detector indications to determine the splice attenuation.

68 Claims, 6 Drawing Sheets

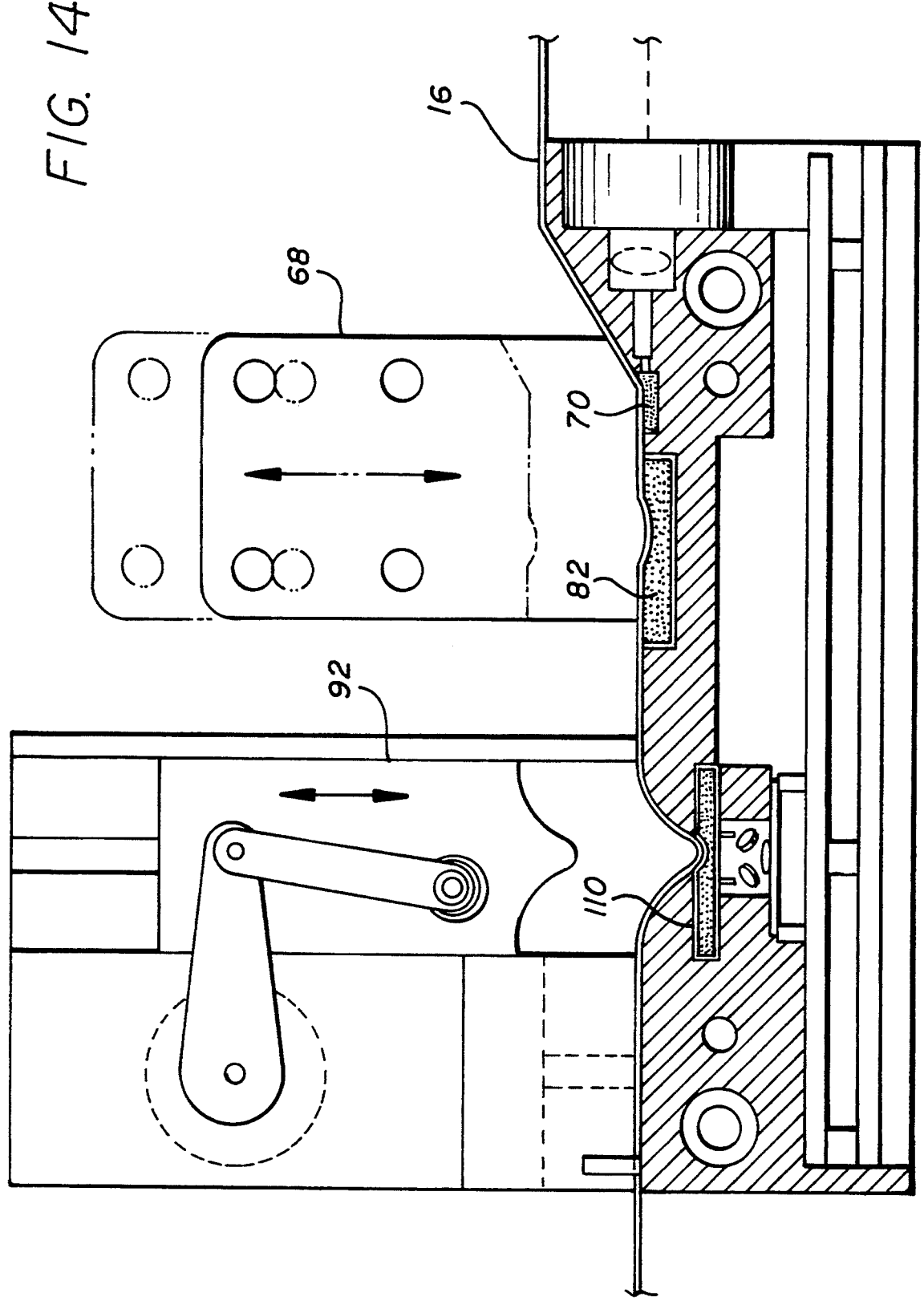

APPARATUS AND METHODS FOR DETERMINING SPLICE EFFECTIVENESS BETWEEN TWO OPTICAL FIBERS USING SOLID GELS AS COUPLING ENHANCERS FOR MEASURING COMPONENT ATTENUATION

This invention relates to apparatus for, and methods of, measuring component attenuation such as the attenuation in the splice of two (2) optical fibers. This determination is more sensitive, more accurate and faster than in the prior art.

Optical fibers are being increasingly used to transmit voice and data between spaced positions. The use of optical fibers has become relatively common for long distance transmission of voice and data. The use of optical fibers is starting to be provided for short distance transmission between a central station and subscribers' homes and offices. The use of optical fibers for such long distance and short distance transmission is accelerating at a rapid rate.

Optical fibers are intended to replace copper wires or cables because of the distinct advantages of optical fibers over copper wires or cables. One advantage is that energy losses in optical fibers are quite low compared to the energy losses in copper wires. Another advantage is that the frequency spectrum of the signals in optical fibers is considerably greater than the frequency spectrum in copper wires. This allows significantly more data to be transmitted in a single time interval in optical fibers than in copper wires. Furthermore, video information can be transmitted relatively easily in optical fibers but with great difficulty in copper wires. This is becoming progressively important as multimedia systems involving the transmission and reception of combinations of voice, data and images in real time become increasingly common. Another advantage of optical fibers over copper wires is that a greater number of messages can be transmitted simultaneously over an optical fiber than over a copper wire without cross-coupling between such messages.

In order to transmit messages through different paths, different pairs of optical fibers have to be spliced. The fibers have to be precisely aligned in order to maximize the benefits discussed in the previous paragraph and to minimize energy losses as the signals representing voice, data and images pass through the fibers. It is also important that the alignment is made in a minimal time and with minimal effort because of the large and increasing number of splices which have to be made.

Systems have been provided in the prior art to determine the effectiveness of optical splices. The prior art systems have certain disadvantages. They are relatively slow and inefficient and they are somewhat inaccurate because they do not provide precise measurements of the relative efficiency in transmitting messages through a splice between a pair of spliced fibers.

U.S. Pat. No. 4,652,123 issued to Richard L. Neumann on Mar. 24, 1987, for a "Method and Apparatus for Measuring Absolute Fiber Junction Loss" discloses an improved system for determining the effectiveness of an optical splice between a pair of optical fibers. In the system of U.S. Pat. No. 4,652,123, a pair of light emitters couple light on an individual basis into the fibers at the opposite ends of a splice. A detector is initially disposed adjacent one of the fibers and near the splice to detect the amount of light in each of the fibers. The detector is then moved to a position adjacent the other fiber and near the splice to detect the amount of light in each of the fibers. These light detections are then processed to determine the effectiveness of the splice.

Although the system of U.S. Pat. No. 4,652,123 constitutes an improvement over the prior art, it still has certain limitations and disadvantages. For example, since the detector has to be moved from a position adjacent one of the fibers to a position adjacent the other fiber, the operation of the system is relatively slow and inefficient.

In co-pending application Ser. No. 07/928,493 filed by Timothy M. Chappel on Aug. 11, 1992, for "Apparatus for, and Methods of, Measuring Component Attenuation" and assigned of record to the assignee of record of this application, an apparatus and a method are disclosed for measuring component attenuation such as measuring the attenuation in a splice of two (2) optical fibers. Four (4) fixed positions are provided. The second position is closer to the splice than the first position on one side of the splice and the third position is closer to the splice than the fourth position on the other side of the splice.

In co-pending application Ser. No. 07/928,493 light emitters such as edge light emitting diodes are disposed at the first and fourth positions and light detectors such as ingass detectors are disposed at the second and third positions. The fibers may be looped at the four (4) positions to facilitate the passage of light into and out of the fibers. Clamps may be provided at each of the four (4) positions to provide for selective activation of individual ones of the detectors.

In this way, light from each of the light emitters may be selectively passed at individual times to each of the detectors to provide indications at the detectors. A data processor may analyze the indications at the detectors to determine the effectiveness of the splice. In the analysis, the processor may provide the square root of the ratio between the product of two (2) of the indications and the product of the other two (2) indications to determine the attenuation in the splice.

The system described in co-pending application Ser. No. 07/928,493, has certain important advantages over the prior art and particularly over the system of U.S. Pat. No. 4,652,123. For example, since the light emitters and detectors are fixedly located during the measurements at the detectors of the light from the light emitters and the detectors are activated by the operation of clamps, the determination of the effectiveness of the splice is more precise than in the systems of the prior art. Furthermore, the determination is faster and more efficient by the system of application Ser. No. 07/928,493 than by the systems of the prior art because none of the light emitters or detectors in the system of application Ser. No. 07/928,493 has to be moved. This application discloses and claims an improvement in the system and method of application Ser. No. 07/928,493. The system of this invention provides output indications of component attenuation with a greater sensitivity and reliability than the system of co-pending application Ser. No. 07/928,493. The system and method of this invention also provide measurements of component attenuation on an automatic basis.

In one embodiment of the invention, a splice is provided of two (2) optical fibers each having a core, a cladding enveloping the core and a buffer enveloping the cladding. First and second positions are adjacent the first fiber and third and fourth positions are adjacent the second fiber. The second and third positions are respectively closer to the splice than the first and fourth positions. Light emitters are at the first and fourth positions and light detectors are at the other positions.

Light from each emitter is selectively passed to individual ones of the detectors. Members (e.g. solid gels) adjacent the emitters direct light into the associated fibers. Other members (e.g. solid gels) respectively between the first and second positions and between the third and fourth positions inhibit the light passage in the fiber claddings and buffers so that only the light in the fiber cores pass to the detectors. The gels and the fibers are clamped to provide matching loops or dimples for trapping in the gels the light in the claddings and buffers.

Still other members (e.g. solid gels) at the detectors enhance the light passage in the cores to the detectors. The gels and the fibers are clamped at the detectors to provide matching loops or dimples for enhancing the light passage in the cores to the detectors. A processor computes the square root of the ratio between the product of two of the detector indications and the product of the other two (2) detector indications to determine the splice attenuation. The gels may constitute a polyurethane defined by approximately three (3) parts Vorite 3029 and approximately two (2) parts Polycin.

In the drawings:

FIG. 14 is a view similar to FIG. 2 and shows another portion of the system, constituting this invention, this portion of the system being associated with the other optical fiber.

Figure 1:
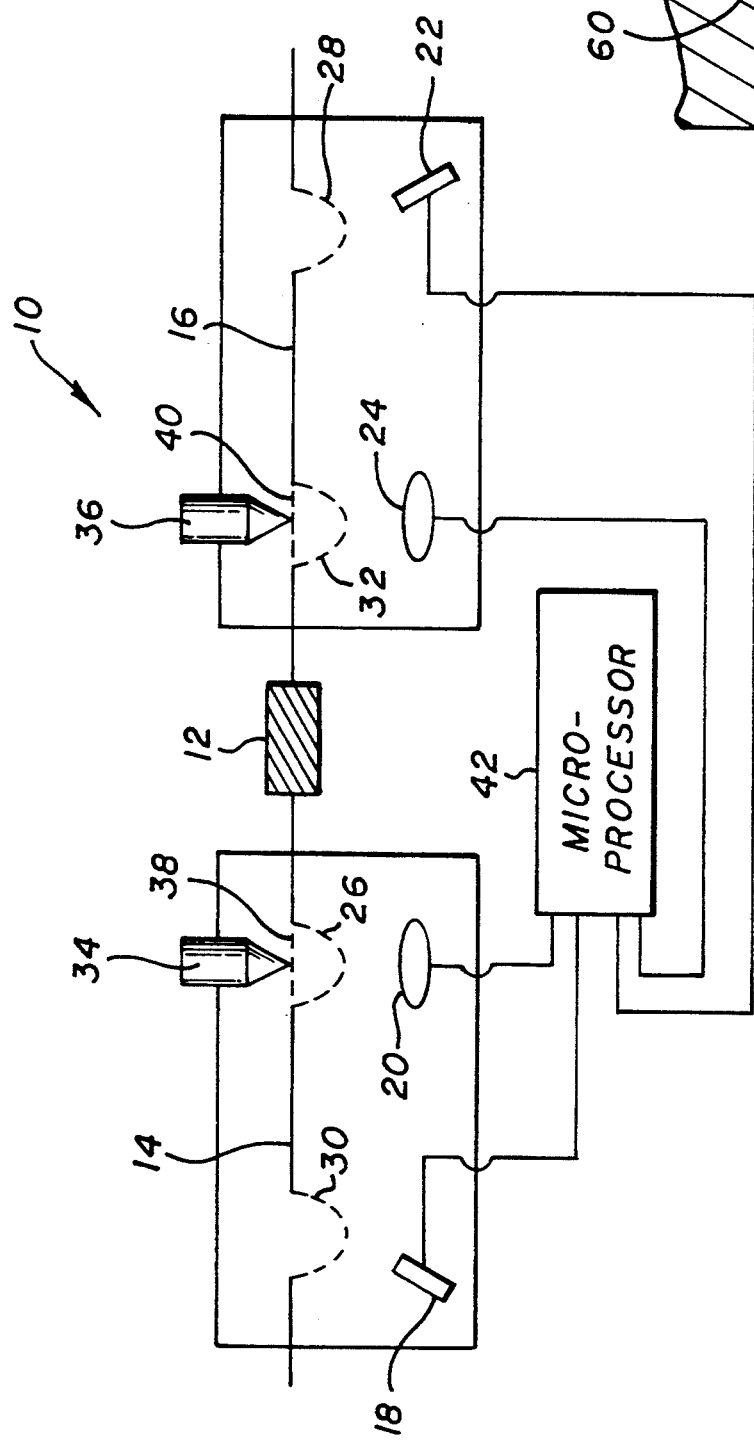
FIG. 1 is a schematic diagram of the optical and electrical features in a system constituting one embodiment of the invention disclosed and claimed in application Ser. No. 07/928,493 for indicating component attenuation such as in a splice of two (2) optical fibers.

A system constituting one embodiment of this invention is generally indicated at 10 in FIG. 1. The system 10 is adapted to measure component attenuation such as the attenuation of a splice 12 linking a pair of optical fibers 14 and 16. The system 10 shown in FIG. 1 is disclosed and claimed in application Ser. No. 07/928,493. Application Ser. No. 07/928,493 may be used to complete any deficiency in the specification and drawings of this application.

A light emitter 18 and a detector 20 are provided at a pair of spaced positions along the optical fiber 14, the detector 20 being closer to the splice 12 than the light emitter 18. In like manner, a light emitter 22 and a detector 24 are provided at a pair of spaced positions along the optical fiber 16. The detector 24 is closer to the splice 14 than the light emitter 22. The light emitters 18 and 22 may be edge light emitting diodes which are well known in the art. They may also be lasers. The light may be continuous or it may be pulsed to improve the signal-to-noise ratio. The light detectors 20 and 24 may be ingass detectors which are well known in the art. They may also be germanium detectors.

The optical fibers 14 and 16 may respectively have loops 26 and 28 when they detect light passing through the fibers. These loops are shown in broken lines to indicate that they are provided only at selected times. Each of the loops 26 and 28 may respectively have a suitable radius such as approximately two millimeters (2 mm). In like manner, loops 30 and 32 may be respectively provided in the optical fibers 14 and 16 at the positions of the light emitters 18 and 20. The loops 30 and 32 may be permanently provided or they may be provided only when their associated light emitters 18 and 22 are energized. The loops 26, 28, 30 and 32 may be respectively provided depending upon which of the light emitters 18 and 22 and which of the detectors 20 and 24 are to be activated at any instant.

Detector clamp actuators 34 and 36 are respectively associated with the detectors 20 and 24 to selectively control the detection of light at the detectors. The clamp actuators 34 and 36 may be motorized. Suitable clamp actuators 34 and 36 are well known in the art. When the clamp actuators are operated, they respectively cause light in the loops 26 and 28 to be detected by their associated detectors. At such times, the fibers may be bent from a linear configuration, as respectively indicated by broken lines 38 and 40, to form the loops 26 and 28. The detector clamp actuators 34 and 36 may be selectively actuated by instructions as from a microprocessor or data processor 42, which may have any suitable construction.

The light emitter 18 may be initially energized by the microprocessor or data processor 42 to couple light into the optical fiber 14. The data processor 42 may initially provide for the detection of light at the detector 20 by operating the detector clamp actuator 34 to produce the loop 26. At this time, the detector clamp actuator 36 is not operated. The detector 20 introduces to the microprocessor or data processor 42 a signal representative of the light detected by the detector 20 at the loop 26. The microprocessor or data processor 42 stores this signal.

The light emitter 18 is then de-energized and the light emitter 22 is energized to pass light into the optical fiber 16. The light passing through the splice 12 from the optical fiber 16 is then detected at the loop 26 by the detector 20 and a signal representing this light is introduced to the microprocessor or data processor 42. The microprocessor data processor 42 stores this signal. The detector clamp actuator 34 is subsequently de-activated and the detector clamp actuator 36 is actuated to form the loop 28.

While the light emitter 22 is still energized, the light at the loop 28 is detected by the detector 24 and the resultant signal is introduced to, and stored in, the data processor 42. The light emitter 22 is then de-energized and the light emitter 18 is energized. The detector 22 then detects the light at the loop 28 from the light emitter 18. The resultant signal is stored in the microprocessor or data processor 42.

Figure 13:
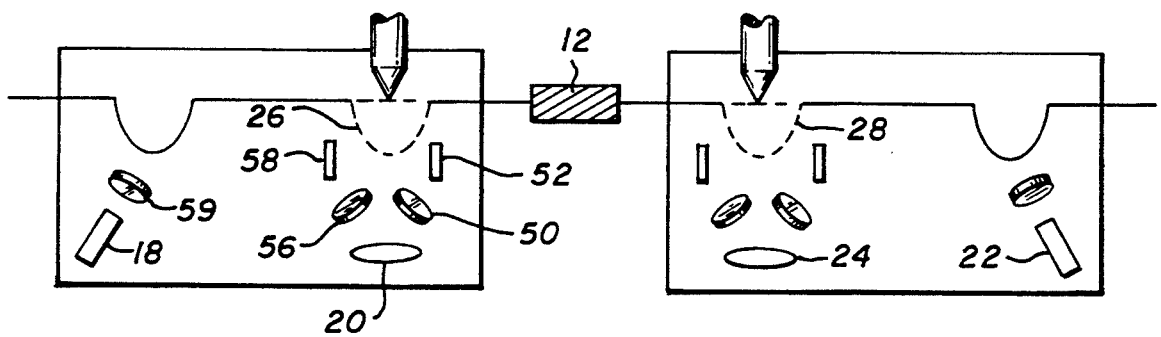
FIG. 13 illustrates another embodiment of the apparatus shown in co-pending application Ser. No. 07/928,493.
Figure 6:
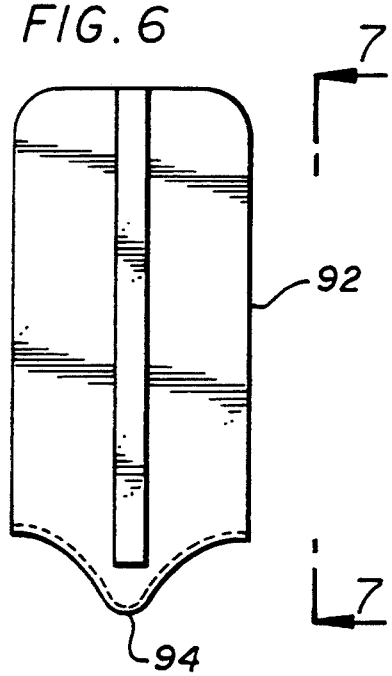
FIG. 6 is a schematic elevational view of one of the clamps shown in FIG. 2 for producing a loop or dimple in one of the optical fibers shown in FIG. 2.
Figure 7:
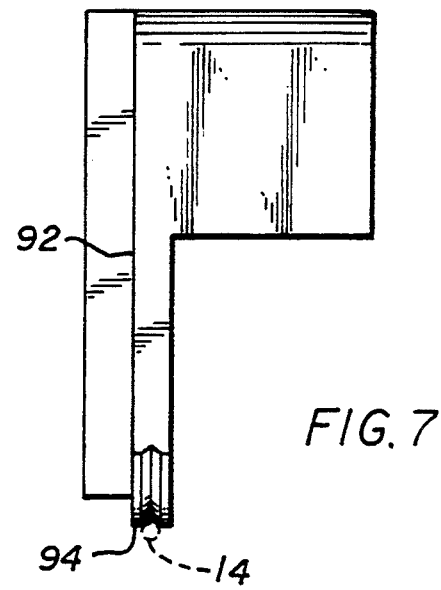
FIG. 7 is a sectional view taken substantially on the line 7—7 of FIG. 6 and illustrates in additional detail the clamp shown in FIG. 6.
Figure 8:
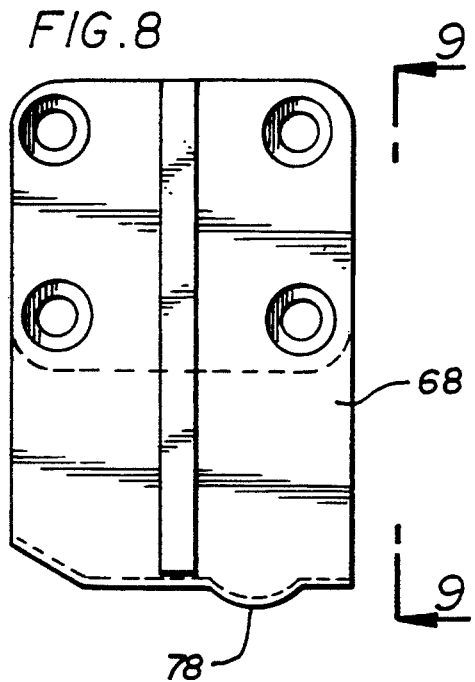
FIG. 8 is a schematic elevational view of another one of the clamps shown in FIG. 2 for producing another loop or dimple in the optical fiber shown in FIG. 2.
Figure 9:
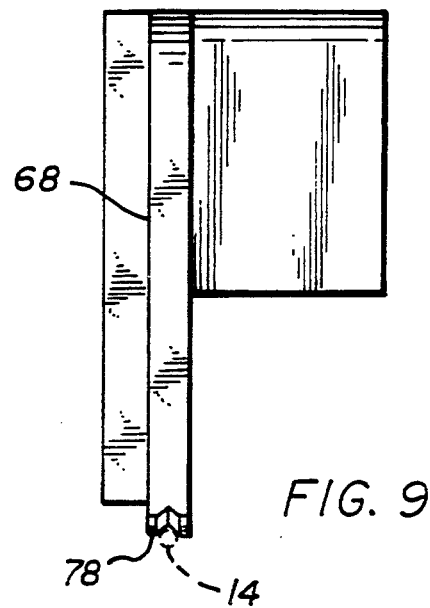
FIG. 9 is a sectional view taken substantially on the line 9—9 of FIG. 8 and illustrates in additional detail the clamp shown in FIG. 8.
Figure 10:
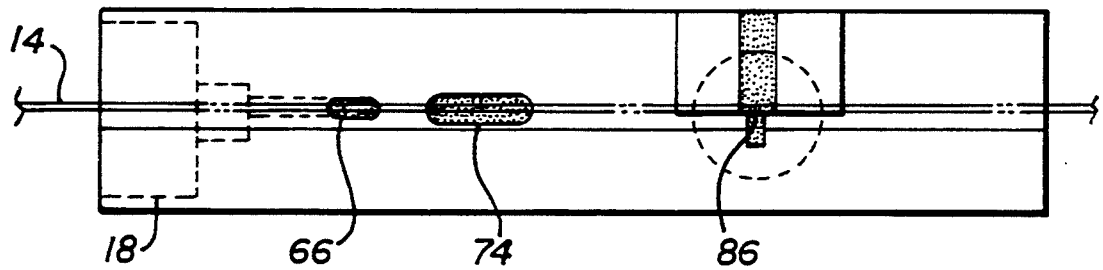
FIG. 10 is a schematic plan view of the clamping apparatus shown in FIG. 2.

The system shown in FIG. 13 is similar to the system shown in FIG. 1. It is also disclosed and claimed in application Ser. No. 07/928,243. However, in FIG. 13, a lens 50 and a mirror 52 are associated with the detector 20 in FIG. 1. The mirror 52 reflects the light travelling through the loop 26 from the emitter 18 and the lens 50 focuses the reflected light on the detector 20. A similar arrangement of a lens 56 and a mirror 58 may be provided in association with the loop 26 to reflect and focus light from the emitter 22 to the detector 20. Similar mirror and lens arrangements may be provided in association with the loop 28 and the detector 24 to reflect and focus light from each of the emitters 18 and 22 to the detector 24. A lens 59 directs the light from the emitter 18 to the loop 30. A similar lens may be associated with the light emitter 22.

The microprocessor or data processor 42 processes the signals from the detectors 20 and 24 to determine the relative amount of the attenuation in the splice 12. The processing of the signals may be in accordance with the following formula:

$$A = \sqrt{P_{18-20}P_{22-20}/P_{18-24}P_{22-24}}$$

In the above equation,
A = attenuation of energy at the splice 12;
$P_{18-20}$ = the amount of light received at the detector 20 from the emitter 18;
$P_{22-20}$ = the amount of light received at the detector 20 from the emitter 22; and
$P_{18-24}$ = the amount of light received at the detector 24 from the emitter 18; and
$P_{22-24}$ = the amount of light received at the detector 24 from the emitter 22; and The processing of the signals may be in digital form to provide an indication of the energy attenuation at the splice 12 in digital form or analog form. Alternatively, the output from the microprocessor 42 may indicate the efficiency of the splice.

The system and method described above have certain important advantages. They provide precise measurements of energy attenuation at the splice 12 and/or energy efficiency at the splice 12 by maintaining the light emitters 18 and 22 and the light detectors 20 and 24 in fixed and precise positions. Since the system and method of this invention provide measurements in a minimal time, there is less of a tendency for signals to drift than in the systems of the prior art. Furthermore, since there is only one (1) detector associated with each individual one of the loops 26 and 28 in the embodiment shown in FIG. 1, the indications of the light passing from the loops are more accurate than the indications in the prior art. The system and method of this invention provide such precise measurements in a minimal time because no adjustments have to be made in the positioning of any light emitters or light detectors after they have been initially and properly positioned. The system and method of this invention provide their output indications in a simple and straightforward manner and with a minimal number of components.

Figure 3:
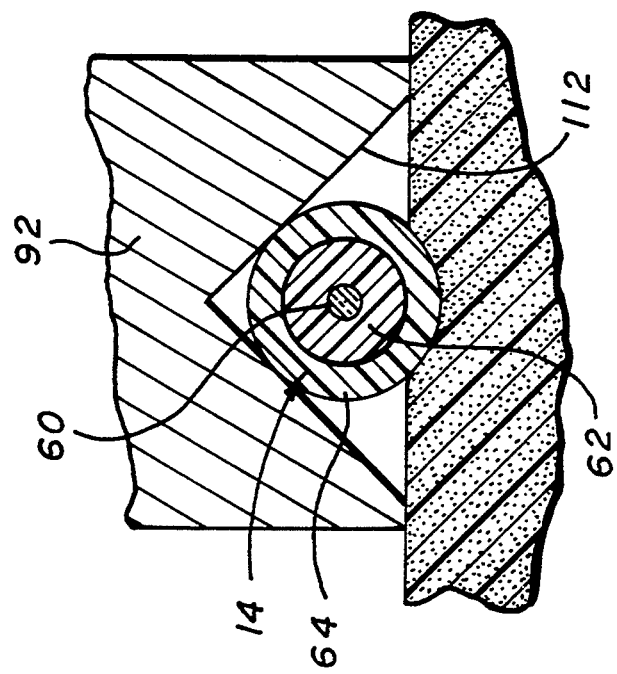
FIG. 3 is an enlarged fragmentary sectional view taken substantially on the line 3—3 of FIG. 2 and illustrates an optical fiber, am optical coupling member (e.g. a solid gel) for attracting light from the optical fiber and a clamp for providing an optimal positioning of the optical fiber relative to the light-attracting member.

Each of the optical fibers 14 and 16 has a core 60 (FIG. 3), a cladding 62 enveloping the core and a buffer 64 enveloping the cladding. The core 60 may be made from a glass doped with a suitable material such as germanium and may be provided with a suitable diameter such as approximately nine microns (9μ). The cladding 62 may be made from pure silicon and may be provided with a suitable diameter such as approximately one hundred and twenty five microns (125μ). The buffer 64 may be made from an acrylate and may be provided with a suitable thickness such as approximately two hundred and fifty microns (250μ).

When the light emitters 18 and 22 constitute light emitting diodes, they provide only about one half of a milliwatt (0.5 mw) to five milliwatts (5 mw) of power. Only about one tenth of one percent (0.1%) to about one percent (1%) of the light from the light emitters is injected into the cores 60 of the optical fibers 14 and 16. As will be appreciated, only the core 60 of the optical fibers 14 and 16 transmits the light through the fibers. The light in the claddings 62 and the buffers 64 of the optical fibers 14 and 16 become dissipated as they travel through the optical fibers. It is accordingly important to measure only the light in the cores 60 of the optical fibers to determine the energy attenuation at the splice 12.

The system shown in FIGS. 1 and 13 and described above can be improved in efficiency. For example, the light from the lens 59 in FIG. 13 has to pass through air to reach the optical fiber 14. This is relatively inefficient. To facilitate the introduction of light into the optical fiber 14, an optical coupling member 66 (FIG. 2) preferably constituting a solid gel is disposed in the path of the light from the lens 59. The optical coupling member 66 is progressively tapered in a direction away from the lens 59 to channel the light into the optical fiber 14. The optical coupling member 66 has properties of attracting the light from the lens 59 and directing the light into the optical fiber 14. The optical coupling member 66 is provided with the tapered configuration by a clamp 68 which applies pressure to the member 66 to have the member adopt the shape shown in FIG. 3. An optical coupling member 70 (FIG. 14) corresponding to the optical coupling member 66 is associated with the optical fiber 16 and is adapted to be clamped in a manner similar to the member 66.

In applicants' system, the distance between the light emitter 18 and the detector 20 and between the light emitter 22 and the detector 24 is approximately two inches (2"). Furthermore, since the core 60 of the optical fiber 14 has a diameter of approximately nine microns (9μ) and the buffer has a diameter of approximately two hundred and fifty microns (250μ), the cross sectional area of the buffer is approximately eight hundred (800) times greater than the cross sectional area of the core. The light from the emitter 20 tends to be launched into the core 60, the cladding 62 and the buffer 64 of the optical fiber 14 because the buffer is not made with enough precision in a radial direction to use the external surface of the buffer as the criterion for precisely locating the core. Because of this, the light injection into the optical fiber 14 tends to be de-focused to insure that at least some of the light from the light emitter 18 will be injected into the core 60 of the optical fiber. In addition to the above, the cladding 62 and the buffer 64 of the optical fiber 14 are reasonable light conductors over distances of a few inches. This is significantly greater than the distance between the light emitter 18 and the light detector 20.

In view of the above, it is important that the optical coupling member 66 should be efficient in trapping the light in the cladding 62 and the buffer 64 of the optical fiber 14 before the light reaches the detector 20. If the light in the cladding 62 and the buffer 64 of the optical fiber 14 is not trapped before it reaches the detector 20, this light will affect the measurement of the energy attenuation at the detector 20. However, substantially all of the light in the cladding 62 and the buffer 64 of the optical fiber 14 will have become dissipated by the time that the light travels to the detector 24. This will affect the measurement in the microprocessor or data processor 42 of the attenuation in the splice 12. Similar problems exist with respect to the light in the cladding 62 and buffer of the optical fiber 16.

An optical coupling member 74 (FIG. 2) preferably made from the same material as the member 66 is disposed between the light emitter 18 and the light detector 20 to trap the light in the cladding 62 and the buffer 64 of the optical fiber 14. The optical fiber 14 is disposed on the optical coupling member 74. The member 74 is provided with a slight loop or dimple as at 76 to facilitate the transfer of the light in the cladding 62 and the buffer 64 of the optical fiber 14 to the optical coupling member 74. The loop or dimple 76 facilitates the transfer of the light in the cladding 62 and the buffer 64 of the optical fiber 14 to the optical coupling member 66. The loop or dimple 76 in the optical coupling member 74 and the corresponding loop or dimple 78 in the optical fiber 14 are formed by the clamp 68 which bears down upon the optical fiber and the optical coupling member. The optical fiber 14 is provided with a loop or dimple 78 corresponding to the loop or dimple 76 in the optical coupling member 74. An optical coupling member 82 corresponding to the optical coupling member 74 may be associated with the optical fiber 16.

The optical coupling member 74 traps the light in the cladding 62 and the buffer 64 of the optical fiber 14 before the light from the emitter 18 reaches the detector 20 even when the distance between the light emitter 18 and the detector 20 is approximately only two inches (2"). The trap for the light in the cladding 62 and the buffer 64 of the optical fiber 14 is provided by the material of the optical coupling member 74 and by the gentle dimple or loop 76 in the optical coupling member 74 and the corresponding loop or dimple 78 in the optical fiber 14. The optical coupling member 74 may be disposed within a case 84 made from a suitable material such as a metal having properties of absorbing the light in the optical coupling member 74. A similar case may envelope the optical coupling member 82 corresponding to the optical coupling member 74 and associated with the optical fiber 16.

Figure 5:
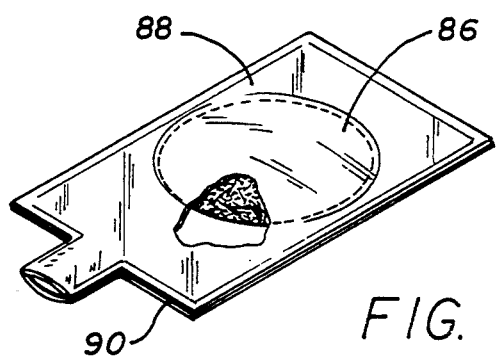
FIG. 5 is a schematic perspective view of another optical coupling member (e.g. a solid gel) shown in FIG. 2 for enhancing the amount of light passing to one of the detectors and also illustrates a package of for removably holding the optical coupling member.

The systems shown in FIGS. 1 and 13 and described above can also be improved in efficiency at the detector 20. For example, as shown in FIGS. 1 and 13, the light has to pass through air from the loop 26 to reach the detector 20. To enhance the detection of the light from the core 60 of the optical fiber 12, an optical coupling member 86 (FIGS. 2 and 5) is provided. The optical coupling member 86 is preferably made from the same material as the optical coupling members 66 and 74. The member 86 may be provided with a thin pancake configuration and may be disposed with the pancake configuration in a horizontal plane. The optical coupling member 86 may be disposed in a jacket 88 defined by a pair of sheets open only at one end as at 90 (FIG. 5) to receive the member 86. The optical fiber 14 is disposed on the jacket 88.

A clamp 92 is forced against the jacket 88 and is provided with a protuberance 94 to form a loop 96 in the optical coupling member 86 and a corresponding loop 97 in the optical fiber 14. The clamp 92 is moved upwardly and downwardly by rotating a member 98 on a pivot pin 100 as a fulcrum. The member 98 may be rotated by a motor 99. The member 98 in turn drives a rod 102 upwardly and downwardly. The rod 102 is in turn coupled to the clamp 92 as by a pin 104. The movement of the clamp 92 is confined to a vertical direction as by spaced walls 106 and 108.

The light in the core 60 of the optical fiber 14 leaves the core at the bottom of the loop 97 and enters into the optical coupling member 86, which is provided with characteristics to attract the light. The light then travels through the optical coupling member 86 to the detector 20 in FIG. 1 or to one of the mirrors 52 and 58 and through one of the lenses 50 and 56 to the detector 20 in FIG. 13. An optical coupling member 110 (FIG. 13) and a jacket having a construction respectively corresponding to the member 86 and the jacket 88 may be associated with the optical fiber 16 at the detector 24 in a manner similar to the association of the optical coupling member 86 and the jacket 88 with the optical fiber 14 at the detector 20.

The optical coupling members 66, 70, 74, 82, 86 and 110 may be made from the same material. Preferably this material is a solid optical gel. A solid gel is advantageous over a liquid gel such as has been generally used in the prior art in optical systems (but not for the same purposes as the system of this invention). Liquids are messy and are often formed from substances, such as silicone, which affect the operation of the electronics which may be contacted by such substances. Furthermore, the liquids are relatively sticky so that the electronics and even the fibers have to be cleaned when they are contacted by the liquids. As will be appreciated, the fibers contact the liquids every time that a measurement is made of the attenuation of the splice 12. When liquids are used, the liquids also have to be refilled fairly often as a result of the contact of the liquid with the electronics and the fibers.

The solid material constituting the members 66, 70, 74, 87, 86 and 110 has certain important advantages. It is soft enough to provide a wetting to the optical fibers 14 and 16. This causes a good optical contact to be produced between the material and the optical fibers 14 and 16. The material is sufficiently self cohesive so that it remains intact through repeated usage. It is sufficiently resilient so that it is able to form the loops 26 and 28 when depressed by clamps such as the clamps 68 and 92. It has a good memory so that it returns to its original configuration after the force on the material as from the clamps 68 and 92 has been released.

The material in the optical coupling members 66, 70, 74, 82, 86 and 110 has other advantages in addition to those discussed in the previous paragraph. The material tends to become dirty from usage. Dirt on the surface of the optical coupling members 66, 70, 74, 82, 86 and 110 tends to produce a deterioration between the optical coupling members and the associated optical fibers or between the optical coupling members and the light emitters 18 and 22 or light detectors 20 and 24. Furthermore, the optical coupling members 66, 70, 74, 82, 86 and 110 tend to become worn from repeated usage. This tends to affect the optical coupling provided by the members. The optical coupling members 66, 70, 74, 82, 86 and 110 can be easily replaced in the system constituting this invention because of the positioning of these coupling members in the system and because of the material from which these coupling members are made.

The material of the optical coupling members may constitute a cross linked polymer such as a polyurethane. The polyurethane may be formed from a mixture constituting three (3) parts of Vorite 3029 and two (2) parts of Polycin 3532. Both of these materials may be obtained from Cas Chemical Company. This ratio of the two (2) materials is different from that normally found in a polyurethane. Specifically, the relative amount of the Vorite 3029 is increased and the relative amount of the Polycin 3532 is decreased from the amounts normally found in a polyurethane. This tends to stiffen the solid gel and decrease the stickiness of the gel. When the two (2) materials forming the polyurethane are mixed, a heat reaction results to produce a cross linking of the polyurethane.

Figure 2:
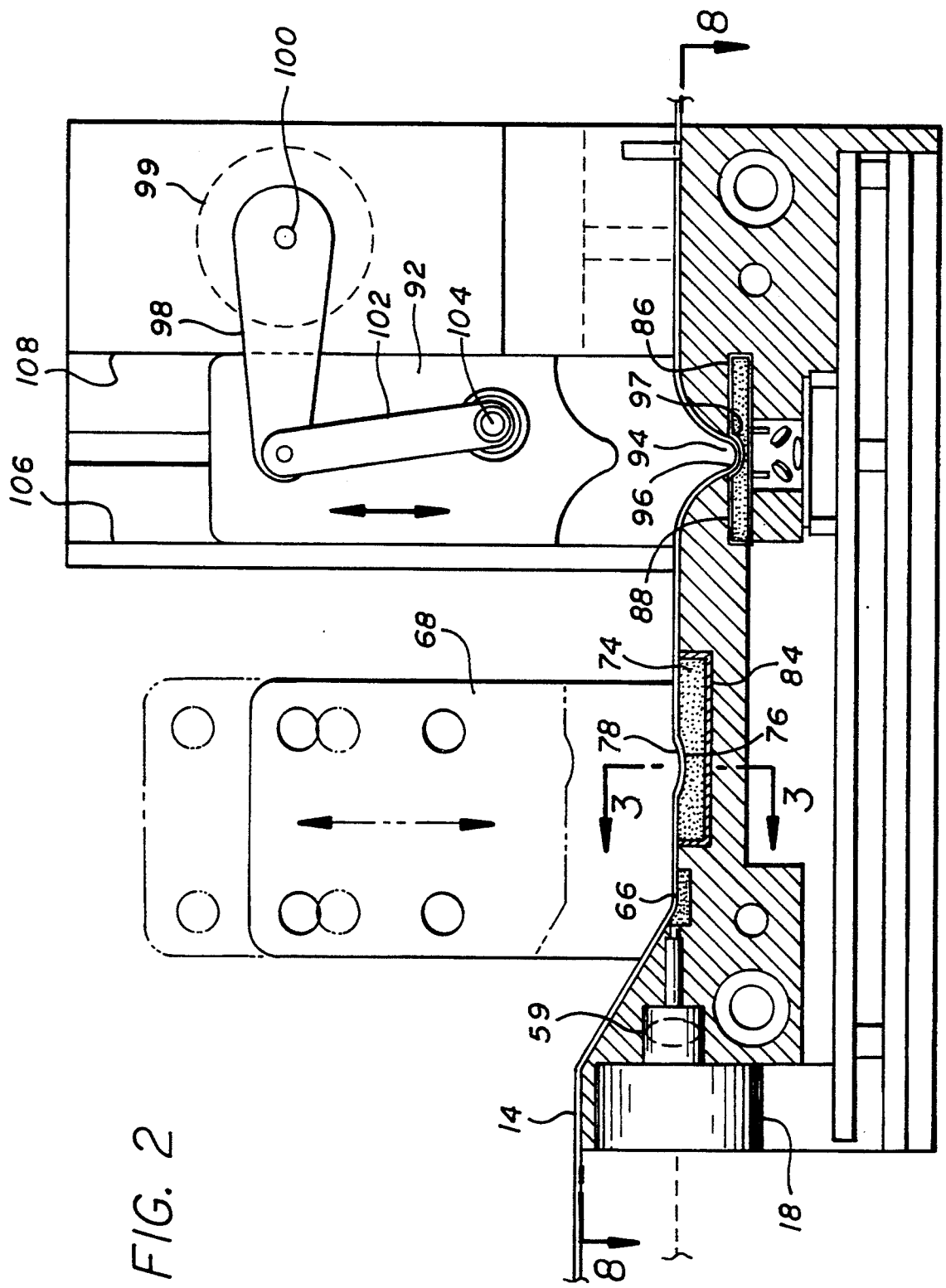
FIG. 2 is an elevational view, partially in section, of a portion of an improved system constituting one embodiment of the invention for providing a more sensitive and precise indication of component attenuation than the system of application Ser. No. 07/928,493, this portion of the system being associated with one of the optical fibers.

As the clamp 92 moves downwardly to have the protuberance 94 engage the optical fiber 14 and the optical coupling member 86 in FIG. 2, the protuberance may improperly engage the optical fiber 14 and improperly position the optical fiber relative to the optical coupling member. This may adversely affect the signal produced at the detector 20. In order to make certain that the optical fiber 14 is properly positioned relative to the optical coupling member 86, the clamp 92 and the protuberance 94 in the clamp are provided with a groove 112 (FIG. 3) extending continuously along the length of the optical coupling member in the direction of the optical fiber 14.

Even with the inclusion of the groove 112 in the clamp 92, the optical fiber 14 may not be properly positioned in the groove 112 if the clamp is lowered in a continuous movement to the optical coupling member 86. To assure that the optical fiber 14 is centered in the groove 112 in the clamp 92, the clamp may be lowered toward the optical coupling member 86 in a continuous movement until the clamp approaches the optical coupling member. Thereafter the clamp 92 may be lowered to the optical coupling member 86 in a sequence of short discontinuous movements. This provides the optical fiber 14 with an opportunity to settle properly into the groove 112 in the clamp 92.

Figures 4A, 4B, 4C:
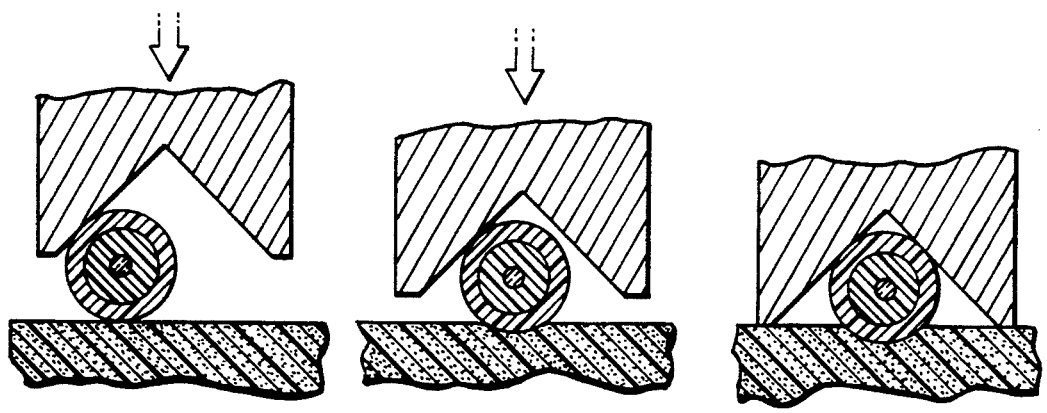
FIGS. 4A, 4B and 4C illustrate progressive positionings of the optical fiber relative to the optical coupling member shown in FIG. 2 until the optical fiber is optimally positioned relative to the optical coupling member.

The movement of the clamp 92 initially in a continuous movement and then in a sequence of short discontinuous movements may be provided on an automatic basis under the control of the microprocessor 42. Alternatively, the clamp 92 may be jiggled upwardly and downwardly a few times after the clamp contacts the optical coupling member 86. This may also be provided on an automatic basis under the control of the microprocessor 42. The progressive positioning of the optical fiber 14 in the groove 112 in the clamp 92 as a result of the discontinuous movements of the clamp is illustrated schematically in FIGS. 4A, 4B and 4C. Similar arrangements may be provided to position the optical fiber 14 on the optical coupling member 80 and to position the optical fiber 16 on the optical coupling members 82 and 110.

Figure 11:
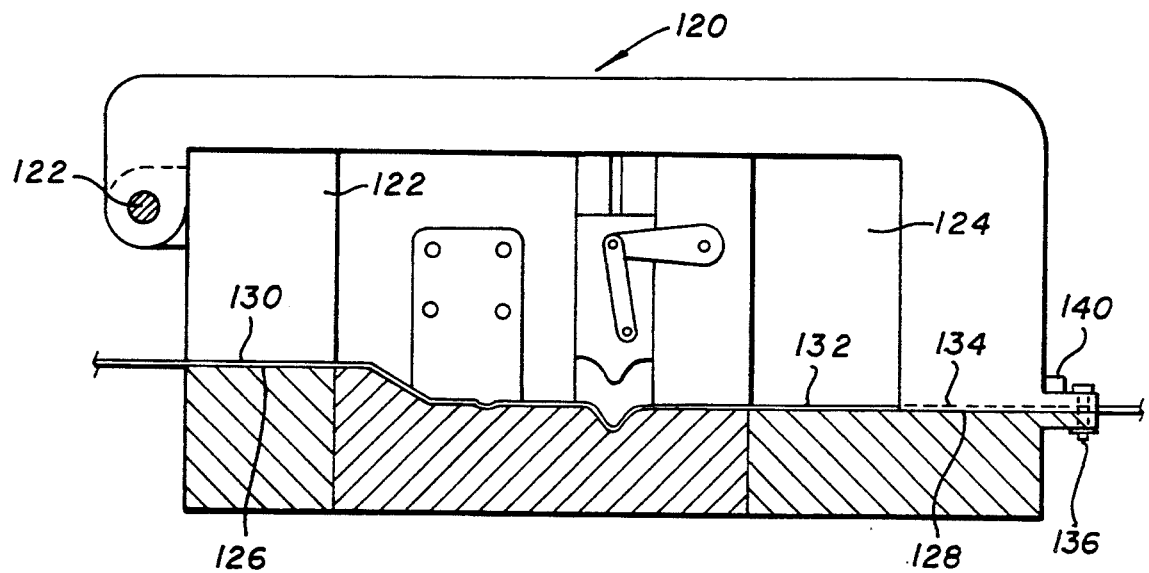
FIG. 11 is an elevational view of the clamping apparatus shown in FIGS. 2 and 10 and additionally shows a cover for the clamping apparatus.
Figure 12:
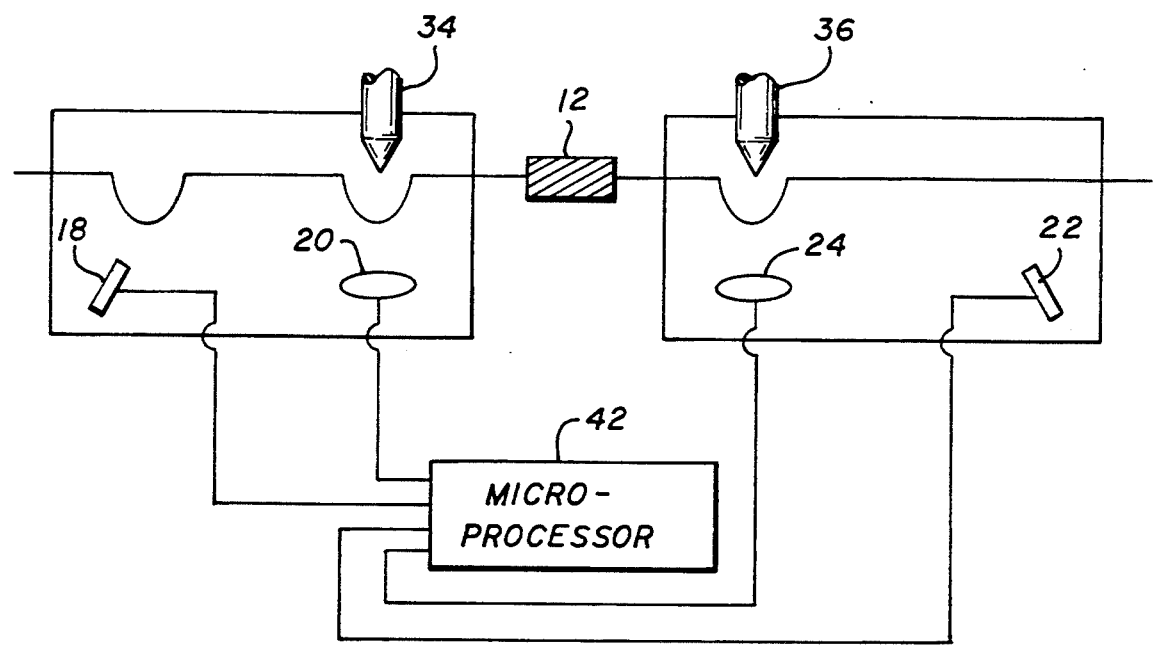
FIG. 12 is a view similar to that shown in FIG. 1 but illustrates another mode of operation of such apparatus, this mode of operation being included within this invention.

In order to position the optical fiber 14 properly on the optical coupling members 66 and 86 (FIG. 2), a cover generally indicated at 120 (FIG. 11) is provided. The cover 120 is pivotable as at 122 and is provided with spaced positioning portions 122 and 124 separated from each other by a distance greater than the distance between the light emitter 18 and the detector 20. The positioning portions 122 and 124 are respectively adapted to be disposed on flat platforms 126 and 128. The bottoms of the positioning portions 102 and 104 are respectively provided with flat surfaces 130 and 132.

A detent slot 134 in the cover 120 is adapted to engage a pin 136 on the platform 128 such that the flat bottom surfaces 130 and 132 on the portions 122 and 124 are respectively separated from the platforms 126 and 128 by a distance slightly greater than the thickness of the optical fiber 14. This allows the optical fiber 14 to move in two (2) perpendicular horizontal directions on the platforms 126 and 128 to accommodate the positions of the optical fiber relative to the optical coupling members 66, 72 and 86 when the optical fiber is pressed downwardly on individual ones of the optical coupling members. A cover corresponding to the cover 120 may be provided to position the optical fiber 16.

The cover 120 described in the previous paragraph has certain important advantages. It provides large areas on the flat bottom surfaces 130 and 132 of the positioning portions 122 and 124 and on the flat platforms 126 and 128 to position the optical fiber 14. This overcomes any tendency of the optical fiber 14 to become caught or pinched and thereby broken. The optical fiber 14 ordinarily has such a tendency since it is stiff and small. As the clamps close against the optical coupling members 66, 72 and 86, the optical fiber 14 is free to move in a first (horizontal) direction corresponding to the length of the fiber and in the horizontal direction perpendicular to this first direction to accommodate the optical fiber.

The system constituting this invention and described above may be operated on an automatic basis. It may include a microswitch 140 which becomes closed when the cover 120 is pivoted so that the positioning portions 122 and 124 become disposed on the platforms 126 and 128. When this occurs, the optical coupling members 66 and 86 can be sequentially clamped and the light emitter 18 can be energized. If the light detector 20 does not sense any light, the clamps at the optical coupling members 66 and 86 can be removed. This provides for a determination whether the optical fiber 14 has been loaded into the system constituting this invention.

A similar procedure to that described can be followed to determine if the optical fiber 16 has been loaded into the system constituting this invention. In this procedure, the optical coupling member 66 is clamped, the light emitter 18 is energized and the optical coupling member 110 is clamped without clamping the optical coupling member 86. This indicates whether the optical fiber 16 is in position in the system constituting this invention.

If the light detectors 20 and 24 respectively indicate that the optical fibers 14 and 16 are in position in the system, the microprocessor 42 can initiate the sequence of operations described previously to measure the light at the individual ones of the detectors 20 and 24 from the individual ones of the light emitters 18 and 22 and to process these light measurements to determine the light attenuation at the splice 12. This sequence includes a clamping of the optical coupling members 66, 70, 74, 82, 86 and 110 in a sequence related to the emission of light from individual ones of the light emitters 18 and 22 and the detection of light at individual ones of the detectors 20 and 24. As will be seen, the system operates on an automatic basis to determine the attenuation at the splice after the microswitch 140 has been closed.

The system constituting this invention can also determine whether the optical coupling members 86 and 110 respectively at the detectors 20 and 24 have been properly clamped. In this mode, the optical coupling member 86 may be clamped and the light emitter 18 may be subsequently energized to obtain a signal at the light detector 20. Thereafter the optical coupling member 110 may be clamped with the optical coupling member 86 still clamped and a measurement may be made at the optical detector 24. The loss through the optical coupling member 86 as a result of the clamp should induce a light of at least twenty decibels (120 db) in the light reaching the coupling member 110. This can provide a self check of the coupling provided by the optical coupling members 86 and 110 when these coupling members are clamped.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In apparatus for determining the effectiveness of a splice of first and second optical fibers each having a core, a cladding enveloping the core and a buffer enveloping the cladding, first means for providing on one side of the splice for a first emission of light into the first fiber and for a first detection of the light in the first fiber in spaced relationship to the first light emission at a position closer to the splice than the first light emission, second means for providing on a second side of the splice for a second emission of light into the second fiber and for a second detection of light in the second fiber in spaced relationship to the second light emission at a position closer to the splice than the second light emission, third means spaced between the first light emission and the first light detection for preventing any light in the cladding and the buffer in the first optical fiber from the first light emission from reaching the position of the first light detection, fourth means spaced between the second light emission and the second light detection for preventing any light in the cladding and the buffer in the second optical fiber from the second light emission from reaching the position of the second light emission, fifth means for providing at different times for the first light detection from the first light emission and from the second light emission and for the second light detection from the first light emission and the second light emission, and sixth means responsive to the detections from the fifth means for processing such detections to provide an indication of the effectiveness of the splice.

2. In the apparatus as set forth in claim 1 wherein
the third means includes a gel with properties of trapping the light in the cladding and the buffer in the first optical fiber and the fourth means includes a gel with properties of trapping the light in the cladding and the buffer in the second optical fiber.

3. Apparatus as set forth in claim 1, including,
seventh means associated with the first light detection for enhancing the first light detection from the first light emission and the second light emission and eighth means associated with the second light detection for enhancing the second light detection from the first light emission and the second light emission.

4. Apparatus as set forth in claim 2 wherein the first and second gels are solid gels.

5. Apparatus as set forth in claim 4, including,
seventh means associated with the first light detection for enhancing the first light detection from the first light emission and the second light emission and eighth means associated with the second light detection for enhancing the second light detection from the first light emission and the second light emission, and
the seventh and eighth means including solid gels.

6. In apparatus as set forth in claim 1 wherein
the first means includes a first gel shaped and disposed to direct the first emission of light into the first fiber and the second means includes a second gel shaped and disposed to direct the second emission of light into the same fiber.

7. In apparatus as set forth in claim 1 wherein
the first means includes a first member depressible and disposed to direct the light in the core of the first fiber to the position for detecting the light in such core and the second means includes a second member depressible and disposed to direct the light in the core of the second fiber to the position for detecting the light in such core, in the first and second members having properties of attracting light.

8. In apparatus for determining the effectiveness of a splice of first and second optical fibers each having a core, a cladding enveloping the core and a buffer enveloping the cladding, first means displaced from the splice for emitting light, second means for directing the light from the light emitting means to the first optical fiber, third means disposed closer to the splice than the light emitting means for eliminating the light in the cladding and the buffer of the first optical fiber and for retaining substantially only the light in the core of the first optical fiber, and fourth means disposed closer to the splice than the third means and responsive to the light in the core of the first optical fiber for detecting such light.

9. In a combination as set forth in claim 8, the third means including a solid gel disposed in contiguous relationship to the first optical fiber for directing the light from the cladding and the buffer in the first optical fiber into the solid gel, the solid gel being dimpled at a position adjacent to the first optical fiber for enhancing the travel of the light from the cladding and the buffer in the first optical fiber into the solid gel.

10. In a combination as set forth in claim 8, the fourth means including a solid gel disposed in contiguous relationship to the first optical fiber and having resilient properties and movable with the first optical fiber into a looped relationship to provide for the travel of light from the core in the first optical fiber to the solid gel.

11. In a combination as set forth in claim 10, the fourth means including a detector disposed relative to the solid gel for receiving the light passing through the solid gel and for producing a signal representative of such light.

12. In apparatus for determining the effectiveness of a splice of first and second optical fibers each having a core, a cladding enveloping the core and a buffer enveloping the cladding, first means displaced from the splice for emitting light, second means for directing the light from the light emitting means to the first optical fiber, third means disposed closer to the splice than the first and second means and responsive to the light from the second means for detecting such light, and fourth means disposed in abutting relationship with the first optical fiber and close to the third means for providing an enhanced passage of light from the first optical fiber to the third means.

13. In apparatus as set forth in claim 12, the fourth means having a surface for receiving the first optical fiber and the fourth means being dimpled to receive and match a dimple in the first optical fiber and having properties of passing light from the core of the first optical fiber to the third means.

14. In apparatus as set forth in claim 13, the fourth means including a solid gel with resilient properties and with properties of receiving light from the dimple in the first optical fiber and the solid gel being dimpled corresponding to the dimple in the first optical fiber.

15. In apparatus as set forth in claim 13, means disposed between the first and third means for inhibiting any passage of light in the cladding and the buffer of the first optical fiber to the third means.

16. In apparatus for determining the effectiveness of a splice of first and second optical fibers each having a core and a cladding enveloping the core and a buffer enveloping the cladding, first means displaced from the splice for emitting light, second means for directing the light from the light emitting means toward the first optical fiber, third means for attracting the light from the second means and for enhancing the passage of light to the first optical fiber, and fourth means disposed closer to the splice than the first, second and third means for detecting the light in the first optical fiber.

17. In a combination as set forth in claim 16, the third means constituting a solid gel with resilient properties and with properties of abutting the first optical fiber to receive the light from the clamped portion of the first optical fiber and properties of being clamped to direct the light into the first optical fiber when light is emitted by the first means.

18. In a combination as set forth in claim 17, means for trapping the light in the core and the buffer of the first optical fiber during the passage of the light through the first optical fiber to the fourth means.

19. In a combination as set forth in claim 17, means for enhancing the detection of the light at the fourth means.

20. In apparatus for determining the effectiveness of a splice of first and second optical fibers and having a core, a cladding enveloping the core and a buffer enveloping the cladding, means for defining first, second, third and fourth fixed positions, the first and second fixed positions being disposed on one side of the splice and the third and fourth fixed positions being disposed on the opposite side of the splice, the second and third fixed positions being respectively disposed closer to the splice than the first and fourth fixed positions, means for emitting light from the first and fourth fixed positions through the optical fibers toward the splice, means for receiving at the second and third fixed positions the light travelling through the cores of the optical fibers from the first and second fixed positions and for providing indications of such received light, means for processing the indications at the second and third fixed positions to provide an indication of the effectiveness of the light splice, and means disposed at the first and fourth fixed positions for attracting the light from the respective ones of the light emitting means at the first and fourth fixed positions and for directing such attracted light into the respective one of the optical fibers.

21. In apparatus as set forth in claim 20, the attracting means including solid gels with resilient properties and with properties of being clamped to enhance the attraction of the light from the respective ones of the light emitting means at the first and fourth fixed positions and for directing such attracted light into the respective one of the optical fibers.

22. In apparatus as set forth in claim 20, means for inhibiting the passage of light through the claddings and buffers of the optical fibers to the receiving means at the second and third fixed positions.

23. In apparatus as set forth in claim 20, means for enhancing the detection of light in the cores at the receiving means at the second and third fixed positions.

24. In apparatus as set forth in claim 21, means including solid gels for trapping the light in the claddings and buffers of the optical fibers before the passage of such light to the receiving means at the second and third fixed positions, and means including solid gels for attracting to the receiving means at the second and third fixed positions the light in the cores of the optical fibers.

25. In apparatus for determining the effectiveness of a splice of first and second optical fibers and having a core, a cladding enveloping the core and a buffer enveloping the cladding, means for defining first, second, third and fourth fixed positions, the first and second fixed positions being disposed on one side of the splice and the third and fourth fixed positions being disposed on the opposite side of the splice, the second and third fixed positions being respectively disposed closer to the splice than the first and fourth fixed positions, means for emitting light from the first and fourth fixed positions through the optical fibers toward the splice, means for receiving at the second and third fixed positions the light travelling through the cores of the optical fibers from the first and fourth fixed positions and for providing indications of such received light, means for processing the indications at the second and third fixed positions to provide an indication of the effectiveness of the light splice, and means for inhibiting the passage of light through the claddings and buffers of the optical fibers to the receiving means at the second and third fixed positions.

26. In apparatus as set forth in claim 25, the inhibiting means including first inhibiting means disposed between the first and second positions in abutting relationship with the first optical fiber and shaped to direct light from the cladding and the buffer in the first optical fiber to the first inhibiting means and including second inhibiting means disposed between the third and fourth positions in abutting relationship with the second optical fiber and shaped to direct light from the cladding and the buffer in the second optical fiber to the second inhibiting means.

27. In apparatus as set forth in claim 26, the first inhibiting means including a first solid gel capable of being dimpled to receive the first optical fiber in an abutting relationship along the dimple and the second inhibiting means including a second solid gel dimpled to receive the second optical fiber in an abutting relationship along the dimple.

28. In apparatus as set forth in claim 25, means for enhancing the passage of light in the cores to the receiving means at the second position and means for enhancing the passage of light in the cores to the receiving means at the third position.

29. In apparatus as set forth in claim 27, means at the first and fourth fixed positions for enhancing the passage of light into the optical fibers from the emitting means at the first and fourth fixed positions.

30. In apparatus for determining the effectiveness of a splice of first and second optical fibers each having a core, a cladding enveloping the core and a buffer enveloping the cladding, means for defining first, second, third and fourth fixed positions, the first and second fixed positions being disposed on one side of the splice and the third and fourth fixed positions being disposed on the opposite side of the splice, the second and third fixed positions being respectively disposed closer to the splice than the first and fourth fixed positions, means for emitting light from the first and fourth fixed positions through the optical fibers toward the splice, means for receiving at the second and third fixed positions the light travelling through the optical fibers from the first and fourth fixed positions and for providing indications of the received light, means for processing the indications at the second and third fixed positions to provide an indication of the effectiveness of the light splice, and means disposed respectively at the second and third positions for enhancing the passage of the light in the cores at the second and third positions to the receiving means.

31. In apparatus as set forth in claim 30, means disposed respectively between the first and second positions and between the third and fourth positions for eliminating any effects of the light in the claddings and buffers in the first and second optical fibers on the light respectively received at the second and third fixed positions.

32. In apparatus as set forth in claim 30, each of the enhancing means at the second and third positions including a solid gel abutting the associated one of the optical fibers for directing the light from the core of the associated fiber to the associated one of the receiving means.

33. In apparatus as set forth in claim 31, the eliminating means including solid gels with dimples in the gels for receiving the optical fibers and for directing the light in the claddings and the buffers in the optical fibers into the solid gels.

34. In apparatus as set forth in claim 32, the solid gels constituting first gels and having properties of receiving the light in the core in the first optical fiber, means disposed respectively between the first and second positions and between the third and fourth positions for eliminating any effects of the light in the claddings and the buffers in the first and second fibers on the light respectively received at the second and third fixed positions, the eliminating means including second solid gels with dimples in the gels for receiving the optical fibers and for directing the light in the claddings and the buffers in the optical fibers into the solid gels.

35. In apparatus as set forth in claim 30, means disposed at the first and fourth positions for enhancing the passage of light from the emitting means into the optical fibers at the first and fourth positions.

36. In apparatus for determining the effectiveness of a splice of first and second optical fibers each having a core, a cladding enveloping the core and a buffer enveloping the cladding, first and second emitting means for emitting light, first and second detecting means for detecting light, the first emitting and detecting means being disposed in co-operative relationship with the first optical fiber and the first detecting means being disposed closer to the splice than the first emitting means, the second emitting and detecting means being disposed in co-operative relationship with the second optical fiber and the second detecting means being disposed closer to the splice than the second emitting means, first, second and third optical coupling means respectively disposed to introduce light into the first optical fiber, to attenuate the light in the cladding and the buffer of the first optical fiber between the first emitting and detecting means and to enhance the detection of light in the cores by the first detecting means, fourth, fifth and sixth optical coupling means respectively disposed to introduce light into the second optical fiber, to attenuate the light in the cladding and the buffer of the second optical fiber between the second emitting and detecting means and to enhance the detection of light in the cores by the second detecting means, first, second, third, fourth, fifth and sixth means for respectively clamping the first, second, third, fourth, fifth and second optical coupling means to obtain the operations specified for the first, second, third, fourth, fifth and sixth optical coupling means, means for obtaining operations of individual ones of the first and second light emitting means and individual ones of the first and second detecting means and individual ones of the first, second, third, fourth, fifth and sixth clamping means in a controlled sequence to obtain measurements of the emission of light through the first emitting means to individual ones of the first and second detecting means and the emission of light through the second emitting means to individual ones of the first and second detecting means, and means for processing the indications at the first and second detecting means to determine the light attenuation at the splice.

37. In apparatus as set forth in claim 36, means for positioning the optical fibers relative to the first through sixth optical coupling means to provide for the respective clamping of the first through sixth optical coupling means and the optical fibers by the first through sixth clamping means, and means for testing for the disposition of the first optical fiber on the first through third optical coupling means and the disposition of the second optical fiber on the fourth through sixth optical coupling means after the positioning of the optical fibers relative to the first through sixth optical coupling means.

38. In apparatus as set forth in claim 36, means for testing for the clamping of the first and second optical fibers respectively on the third and sixth optical coupling means by measuring the relative amounts of the light detected at the first and second detecting means with the optical fibers respectively clamped on the third and sixth optical coupling means and with the first light emitting means energized.

39. In apparatus as set forth in claim 38, cover means movable between open and closed positions, platform means associated with the cover means in the closed position of the cover means for positioning the optical fibers for clamping of the optical fibers on the optical coupling means by the clamping means, and means responsive to the closure of the cover means on the platform means for initiating tests to determine the clamping of the first and second optical fibers on the third and sixth means and to determine the attenuation of the light in the splice.

40. In apparatus for determining the effectiveness of a splice of first and second optical fibers having a core, a cladding enveloping the core and a buffer enveloping the cladding, an optical coupling member constructed to abut one of the optical fibers, means for clamping the fiber against the optical coupling member, the clamping means having a groove for snugly receiving the optical fiber, and means for initially providing a continuous movement of the clamping means toward the optical coupling member and then subsequent discontinuous movements of the clamping means toward the optical member to provide for a disposition of the optical fiber snugly in the groove in the clamping means and to provide for a clamping of the optical coupling member and the optical fiber by the clamping means.

41. In apparatus as set forth in claim 40, the clamping means having a protuberance and having a groove in the protuberance to receive the optical fiber and to produce a dimple in the optical coupling member and a corresponding dimple in the optical fiber.

42. In apparatus as set forth in claim 41, there being a light emitter and a light detector spaced from each other along the length of an individual one of the optical fibers, the optical coupling member being disposed between the light emitter and the light detector to trap the light in the cladding and the buffer of the optical fiber before such light reaches the detector.

43. In apparatus as set forth in claim 42, there being a casing enveloping the light conducting member to absorb the light in the light conducting member.

44. In apparatus as set forth in claim 41, there being a light emitter and a light detector spaced from each other along the length of an individual one of the optical fibers, the optical coupling member being disposed at the light detector to enhance the detection of the light in the core of the optical fiber.

45. In apparatus as set forth in claim 42, the optical coupling member having a pancake configuration and being removably disposed in a flexible jacket.

46. In apparatus as set forth in claim 41, there being a light emitter and a light detector spaced from each other along the length of an individual one of the optical fibers, the optical coupling member being disposed at the light emitter to enhance the transfer of the light from the light emitter into the optical fiber.

47. In apparatus as set forth in claim 41, the optical coupling member constituting a solid resilient gel with properties of attracting light and with properties of being dimpled upon the application of a clamping force against the gel and with properties of returning to its original position after the release of the clamping force.

48. In a method of determining the effectiveness of a splice of two (2) optical fibers each having a core and a cladding enveloping the core and a buffer enveloping the cladding, the steps of:

providing light emitting members at first and second positions relative to the splice and providing light detecting members at third and fourth positions relative to the splice, the first and second positions being on one side of the splice and the third and fourth positions being on the other side of the splice, the second and third positions being respectively closer to the splice than the first and fourth positions, providing for the elimination of light in the cladding and the buffer in the first optical fiber before the passage of the light from the first position to the second position, providing for the elimination of light in the cladding and the buffer in the second optical fiber before the passage of the light from the fourth position to the third position, providing for the selective activation of an individual one of the light emitting members at individual ones of the first and fourth positions and an individual one of the light detecting members at individual ones of the second and third positions to provide for the detection at individual ones of the second and third positions of the light from the individual ones of the first and fourth positions, and processing the individual detections of light at each of the second and third positions from each of the first and fourth positions to provide an indication of the effectiveness of the splice.

49. In a method as set forth in claim 48, the steps of:
enhancing the passage of the light in the core of the first optical fiber during the passage of the light from the first position to the second position, and
enhancing the passage of the light in the core of the second optical fiber during the passage of the light from the fourth position to the third position.

50. In a method as set forth in claim 48 wherein
the step of eliminating the light in the cladding and the buffer of the first optical fiber includes the direction of the light in such cladding and such buffer into a first gel receptive to such light and
the step of eliminating the light in the cladding and the buffer of the second optical fiber includes the direction of the light in such cladding and buffer into a second gel receptive to such light.

51. In a method as set forth in claim 50,
the first gel being a solid gel and the first optical fiber being dimpled and the first gel being provided with a corresponding dimple to receive the dimple in the first optical fiber and facilitate the direction of the light in the cladding and the buffer of the first optical fiber into the first gel, and
the second gel being a solid gel and the second optical fiber being dimpled and the second gel being provided with a corresponding dimple to receive the dimple in the second optical fiber and facilitate the direction of the light in the cladding and the buffer of the second optical fiber into the second gel.

52. In a method of determining the effectiveness of a splice of two (2) optical fibers each having a core and a cladding enveloping the core and a buffer enveloping the cladding, the steps of:
providing light emitting members at first and fourth positions relative to the splice and providing light detecting members at second and third positions relative to the splice, the first and second positions being on one side of the splice and the third and fourth members being on the other side of the splice, the second and third positions being respectively closer to the splice than the first and fourth positions, enhancing the passage of the light through the core of the first optical fiber from the first position to the second position, enhancing the passage of the light through the core of the second optical fiber from the fourth position to the third position, providing for the selective activation of an individual one of the light emitting members at individual ones of the first and fourth positions and an individual one of the light detecting members at individual ones of the second and third positions to provide for the detection at individual ones of the second and third positions of the light from the individual ones of the first and fourth positions, and processing the individual detection of light at each of the second and third positions to provide an indication of the effectiveness of the splice.

53. In a method as set forth in claim 52,
the passage of the light through the core of the first optical fiber from the first position to the second position being enhanced by providing a first solid gel with a planar configuration and disposing the optical fiber on the first solid gel and producing matching dimples in the first optical fiber and the first solid gel to obtain the passage of light from the core of the first optical fiber to the first solid gel and disposing the first light detecting member in a planar relationship with the first solid gel, and the passage of the light through the core of the second optical fiber from the fourth position to the third position being enhanced by providing a second solid gel with a planar configuration and disposing the optical fiber on the second solid gel and producing matching dimples in the second optical fiber and the second solid gel to obtain the passage of light from the core of the second optical fiber to the second solid gel and disposing the second light detecting member in a particular relationship with the second solid gel.

54. In a method as set forth in claim 53,
providing for the elimination of light in the cladding and buffer of the first optical fiber before the passage of light from the first position to the second position, and
providing for the elimination of light in the cladding and buffer of the second optical fiber before the passage of light from the fourth position to the third position.

55. In a combination as set forth in claim 54,
the elimination of the light in the cladding and the buffer of the first optical fiber being provided by disposing a third solid gel between the first and second positions and disposing the first optical fiber on the third solid gel and providing matching dimples in the first optical fiber and the third solid gel, and
the elimination of the light in the cladding and the buffer of the second optical fiber being provided by disposing a fourth solid gel between the third and fourth positions and disposing the second optical fiber on the fourth solid gel and providing matching dimples in the second optical fiber and the fourth solid gel.

56. In a method of determining the effectiveness of a splice of two (2) optical fibers each having a core and a cladding enveloping the core and a buffer enveloping the cladding, the steps of:

providing for the emission of light from first and fourth positions respectively displaced along the fibers in opposite directions from the splice, providing for the detection of light from second and third positions displaced along the fibers in opposite directions from the splice and respectively closer to the splice than the first and fourth positions, providing optical coupling members at the first, second, third and fourth positions and at a fifth position between the first and second positions and at a sixth position between the third and fourth positions, providing for a clamping of individual ones of the optical coupling members, providing an emission of light at individual ones of the first and fourth positions and a clamping of individual ones of the clamping members in a sequence to obtain detections at individual ones of the second and third positions of the light emitted at each of the first and fourth positions into the cores of individual ones of the first and fourth optical fibers, and processing the light detections at the second and third positions to determine the light attenuation at the splice.

57. In a method as set forth in claim 56, the step of:

providing for the positioning of the optical fibers relative to the optical coupling members as a first step to obtain the clamping of the optical fibers and the individual ones of the optical coupling members for the emission of light from the individual ones of the first and fourth positions to individual ones of the second and third positions.

58. In a method as set forth in claim 57, the step of:

testing to determine the positioning of the optical fibers before the sequence to determine the attenuation of light at the splice.

59. In a method as set forth in claim 57, the steps of:

injecting light at one of the first and fourth positions while the optical coupling members are clamped at the second and third positions, and determining the relative amounts of light sensed at the second and third positions to determine the proper operation of the clamps for the optical coupling members at the second and third positions.

60. In combination for directing light from an optical fiber, a jacket defined by a pair of spaced flaps having sides with corresponding configurations, the flaps being disposed in contiguous relationship with the flaps in corresponding relationship, the sides of the flaps being connected but defining an opening at one end, and a solid gel provided with a pancake configuration and disposed in the jacket and removable from the housing through the opening and having properties of attracting light from the optical fiber when the optical fiber is disposed in contiguous relationship with the solid gel in the jacket.

61. In a combination as recited in claim 60, the optical gel constituting a polyurethane with resilient properties.

62. In a combination as recited in claim 61, the polyurethane in the optical gel being formed from three (3) parts of Verite 3029 and two (2) parts of Polycin.

63. In apparatus as set forth in claim 8, the third means being disposed between the second and fourth means in abutting relationship with the first optical fiber and shaped to direct light from the cladding and the buffer on the first optical fiber to the eliminating means.

64. In apparatus as set forth in claim 63, the third means including a solid gel dimpled to receive the first optical fiber in an abutting relationship along the dimple.

65. In apparatus as set forth in claim 8, means for enhancing the passage of light through the core of the first optical fiber to the fourth means.

66. In apparatus as set forth in claim 25, the inhibiting means including first inhibiting means disposed between the first and second positions in abutting relationship with the first optical fiber and shaped to attract light from the cladding and the buffer in the first optical fiber to the first inhibiting means and including second inhibiting means disposed between the third and fourth positions in abutting relationship with the second optical fiber and shaped to attract light from the cladding and the buffer in the second optical fiber to the second inhibiting means.

67. In apparatus as set forth in claim 66, the first inhibiting means including a first solid gel dimpled to receive the first optical fiber in an abutting relationship along the dimple and the second inhibiting means including a second solid gel dimpled to receive the second optical fiber in an abutting relationship along the dimple.

68. In apparatus as set forth in claim 67, means for enhancing the passage of light to the receiving means at the second position and means for enhancing the passage of light to the receiving means at the third position.

* * * * *